United States Patent [19]

Franz

[11] Patent Number: 5,609,761
[45] Date of Patent: Mar. 11, 1997

[54] FILTER MEDIUM AND PROCESS FOR MAKING SAME

[76] Inventor: Andreas Franz, Fernholzstr. 118, 48159 Münster, Germany

[21] Appl. No.: 527,139

[22] Filed: Sep. 12, 1995

[30] Foreign Application Priority Data

Sep. 16, 1994 [DE] Germany ............ 44 33 129.0

[51] Int. Cl.⁶ .................................... B01D 27/06
[52] U.S. Cl. .................... 210/493.1; 210/493.4; 210/493.5; 55/497; 55/498; 55/500; 55/521; 55/524
[58] Field of Search ............ 210/493.1, 493.4, 210/493.5; 55/497, 498, 500, 521, 524

[56] References Cited

U.S. PATENT DOCUMENTS

| | | |
|---|---|---|
| 3,419,937 | 6/1969 | Bally . |
| 3,531,920 | 10/1970 | Hart . |
| 4,046,697 | 9/1977 | Briggs et al. .......... 210/493.1 |
| 4,310,419 | 1/1982 | Nara et al. ............ 210/493.5 |
| 4,687,697 | 4/1987 | Cambo et al. ........... 21/493.5 |
| 5,006,400 | 11/1991 | Rocklitz et al. ........ 210/494.1 |
| 5,290,447 | 3/1994 | Lippold ................ 210/493.1 |

FOREIGN PATENT DOCUMENTS 4038966  6/1992  Germany .

Primary Examiner—W. L. Walker
Attorney, Agent, or Firm—Victor M. Genco, Jr.

[57] ABSTRACT

In a process for the production of a filter medium in particular in the form of a pleated bellows for a filter cartridge for dust separation, at least one surface of the filter medium is provided with an embossed structure, consisting of a multitude of raised embossed elements, preferably in the form of burls or ribs. Furthermore such surfaces of the filter medium are subjected to an additional treatment in the area of the embossed spots by application of a layer of a curable, dryable coating mass and/or heat so that an added mechanical resistance/strength/abrasion resistance is obtained in the area of these treated embossed parts. Due to this process for the production of a filter medium it is possible to create a filter medium—in particular one consisting of mechanically sensitive materials, e.g., thermoplastic materials or nonwovens made from synthetic fibers—which can be provided with an embossed structure on at least one of its surfaces for the purpose of ensuring a sufficient distance between the pleats of the filter cartridge during the cleaning process. At the same time wear and tear of the filter material is precluded at the spots where the pleats touch each other despite the raised parts created by embossing, i.e., in the area of the contact points material wear and abrasion of the filter material is prevented while the gas to be cleaned flows in and while the filter material is cleaned.

14 Claims, 5 Drawing Sheets

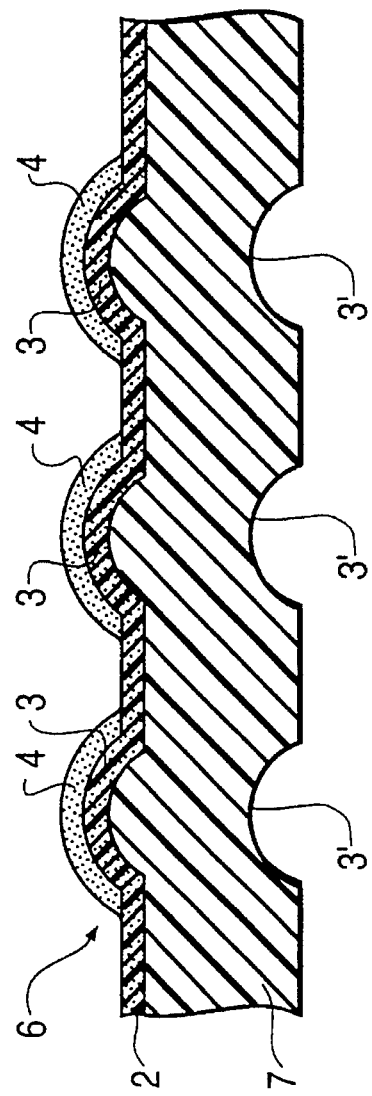
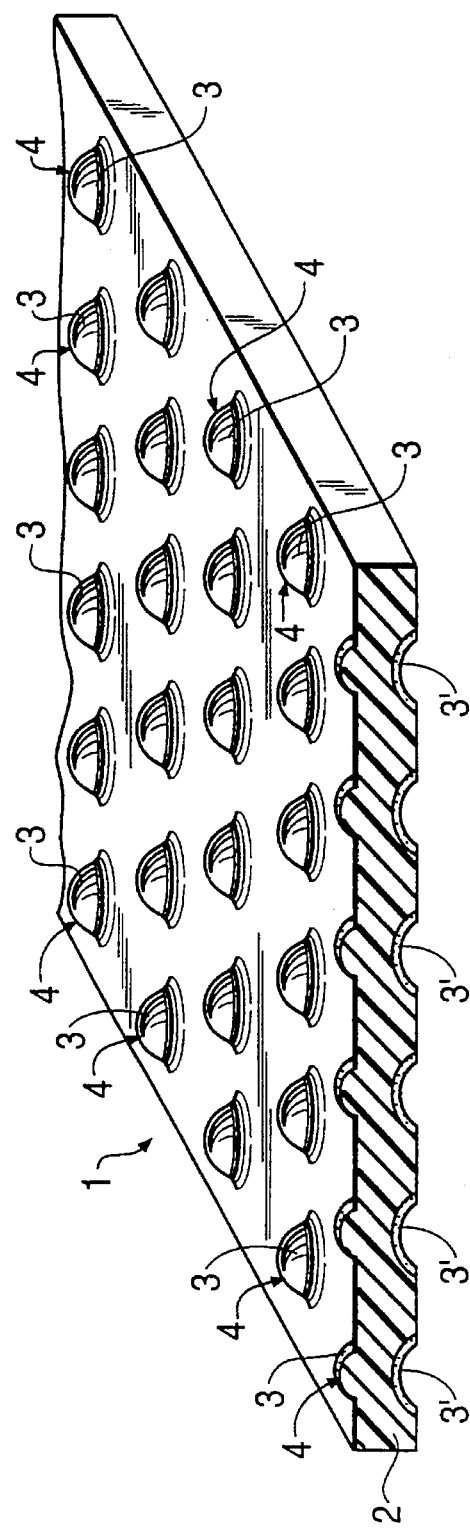

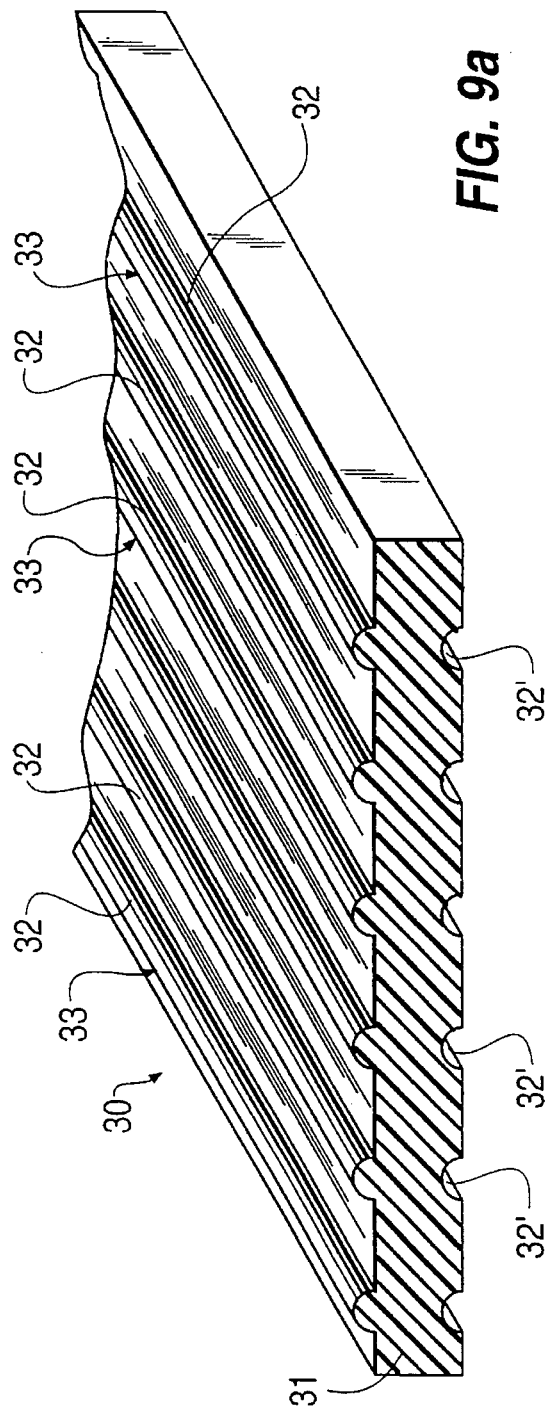
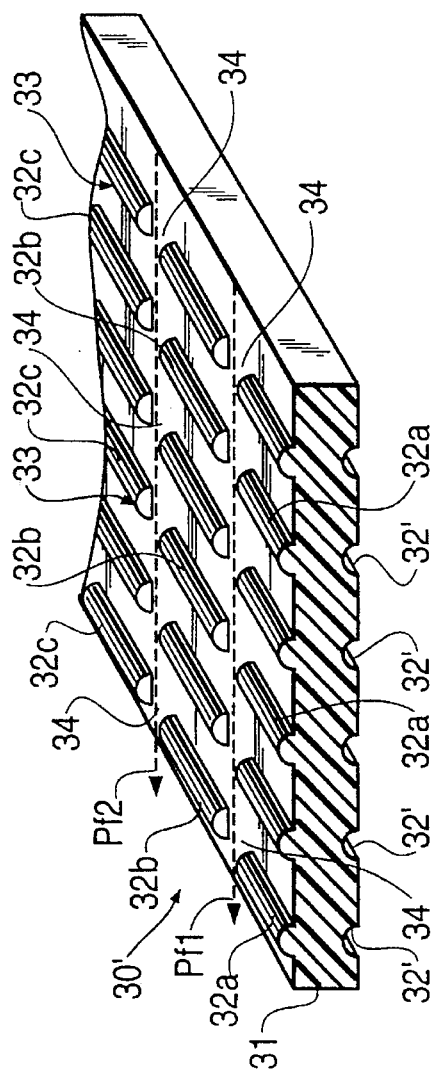
FIG. 9
FIG. 9a

FILTER MEDIUM AND PROCESS FOR MAKING SAME

FIELD OF THE INVENTION

The invention relates to a process for the production of a filter medium, in particular in the form of a pleated bellows for a filter cartridge for dust separation, wherein at least one surface of the filter medium is embossed to produce a multitude of raised, preferably bud-like or rib-like embossed spots.

BACKGROUND OF THE INVENTION

Filter cartridges have been used more and more frequently in industrial dedusting processes during recent years. The filter cartridges generally consist of: a supporting grid; a filter medium in the form of a pleated bellows, which is arranged around the supporting grid in the form of a cylinder; a lower closed end piece; and an upper end piece with a central outlet. The bellows is attached to the two end pieces so as to avoid dust leakage.

It is state of the art to use mainly filter paper or thermally bonded non-wovens as filter media for such filter cartridges. It is most important that the filter material, pleat depth, and the number of pleats interact to accommodate a sufficiently large filter surface in a filter cartridge. On the one hand, the filter material must be rigid enough to prevent the pleats from clinging together or lying directly on each other during the cleaning process, which might considerably reduce the effective filter area. On the other hand, the material must be flexible enough so that cleaning is supported by the relative movements between the surface of the filter medium and the dust layer and that the forces impacting the filter cartridge be absorbed without damage to the filter medium.

For this purpose it is state of the art to hold the folded filter material stationary by various spacer constructions. It is essential to ensure the correct distances between component parts because any clinging together of the pleats of the pleated bellows would reduce the filter surface, worsen separation efficiency, and lead to increased pressure losses due to insufficient cleaning of the remaining filter area.

Furthermore the state of the art includes a method wherein filter paper (which is frequently used because it is relatively stiff) is provided with a spacer function by embossing the filter paper (e.g., during the pleating process). After this process, the filter paper is hardened, e.g., in an oven, which leads to a permanent embossing effect in the material. Then the filter paper is built into the cartridge such that the raised embossed parts of every two pleats of the pleated bellows are in contact with each other, which results in a spacer effect.

However, certain shortcomings have been experienced with the embossing of filter paper. Above all, the filter paper is heavily stressed at the embossed spots so that minor material variations entail a danger of faulty "buds" that can fatally damage or severely shortening the service life of a new filter cartridge.

Other filter materials may be used for the above mentioned filter cartridges, e.g., thermoplastic materials or non-wovens made from synthetic fibers. Here, too, measures must be taken to ensure the required spacing effect.

As has been determined, the embossing described above for paper filters cannot be performed on filter media consisting of mechanically sensitive materials, such as expanded PTFE, because wear and tear occurs due to friction between the individual pleats of the pleated bellows at the points where such raised parts or buds touch each other. This condition negatively affects the retention capacity of the filter medium in such areas.

SUMMARY OF THE INVENTION

Considering all these facts, the purpose of the present invention is to provide for a filter medium and a process for the production of the filter medium, in particular a filter medium consisting of mechanically sensitive materials which is provided with an embossed structure at least on one surface to create a spacing effect, such that despite the embossed structure there is no material wear at the points where buds or rib-like raised parts touch each other.

The present invention provides a process whereby raised elements, preferably embossed parts, of the surface of the filter medium are subjected to an additional treatment after application of a layer of a curable or dryable coating mass and/or an additional heat treatment so that an increased mechanical resistance, strength, and/or abrasion resistance is obtained in the area of the treated embossed parts. This inventive treatment on the surface of the filter medium virtually seals the raised embossed parts so that abrasion of the filter material is advantageously prevented in the areas where the filter parts touch during operation of filter cartridges made from such materials. In other words, when the filter parts are charged with the gas to be cleaned and during the cleaning process, abrasion of the filter material is advantageously reduced.

In the framework of the process of the invention, curable or dryable coating masses of various substances may be used. For instance, coating can be accomplished through use of adhesives, e.g., one-component adhesives, such as polyurethane or acrylates, or multi-component adhesives, such as epoxy resins. Adhesives of this type may be applied through a nozzle and are cured over time, e.g., by heat, UV irradiation or electron irradiation, by air humidity, or a chemical reaction.

Furthermore it is possible to use a thermoplastic material as the coating mass which hardens when cooled, such as polyethylene, polypropylene, polyester or a high-temperature thermoplastic material, such as fluoroethylene propylene or perfluoroalkoxy.

Furthermore, prefabricated adhesive or plastic nets may be used as the coating mass. They are applied in accordance with the position and distribution of the embossed areas on the surface of the filter medium and subsequently heat reactivated and heat set.

In the framework of the process of the invention it is furthermore possible to use silicone, a hot-melt mass, or a varnish as coating mass.

In the framework of the process of the invention, furthermore, the coating mass covered embossed spots may be subjected to an additional thermal treatment to enhance the hardening or drying of the coating mass applied and, in particular, to accelerate this process. This may in particular be effected with the help of small welding plates or by using a soldering iron or soldering pad.

If the additional treatment and sealing in the area of the embossed spots is to be effected by heat only, this may be effected with the help of small welding plates, for example.

Another possibility for purely thermal treatment or sealing in the area of the embossed spots is to use a soldering iron or a soldering pad.

Generally speaking, all coating masses can be used in the framework of the present invention as long as they can withstand typical operating temperatures required for the final filter cartridge. Normally operating temperatures generally range between 60° and 260° C., and in particular in a range between 60° and 120° C.

Due to the process of the present invention there is the advantageous possibility also to use materials which are relatively sensitive from a mechanical point of view as filter media. Sensitive materials may be preferable for certain applications, for example, in the form of a laminate which consists of a carrier material and an expanded polytetrafluoroethylene material.

Also a material which consists of a carrier material and a glass fiber filter material may be used for the filter medium. A suitable carrier material for such laminates is, for example, polyester. Glass fibers alone may also be used as a material for the filter medium.

In all such materials, a relatively high mechanical abrasion resistance can be achieved in the area where the embossed parts touch each other, due to the manufacturing process of the invention, so that during operation of the filter cartridges these filter media can withstand relatively high loads.

BRIEF DESCRIPTION OF THE DRAWINGS

In the following the present invention will be explained in more detail with reference to some embodiments and the following Figures:

FIG. 4 is a schematic sectional view through the filter medium of FIG. 3, whose surface has now been provided with a prominent embossed structure and has subsequently been subjected to an additional treatment applying the process of the invention.

FIG. 5 is a schematic, perspective partial view of a film-shaped part of a filter medium according to FIG. 2.

FIG. 9 is a schematic perspective partial view of another embodiment of a filter medium with prominent embossed parts on one of its surfaces, in the form of ribs which extend in parallel to each other and which have been subjected to an additional treatment using the process of the invention.

FIG. 9a is an embodiment of a filter medium which is similar to the one shown in FIG. 9 but modified to provide discontinuous ribs.

DETAILED DESCRIPTION OF THE INVENTION

Figure 1:
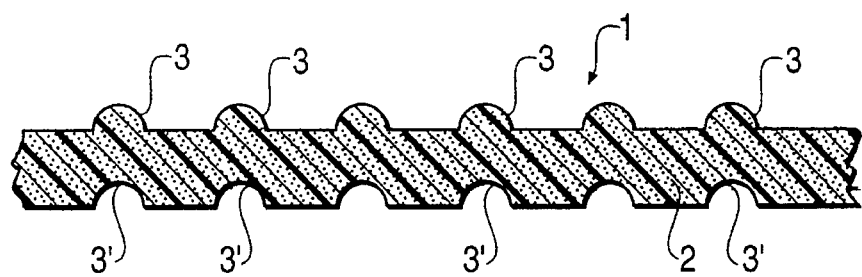
FIG. 1 is a schematic sectional view through a filter medium whose surface has been embossed to form a plurality of protuberances.

As can be seen in FIG. 1, a filter medium 1, from which a filter cartridge is made, as explained later with reference to FIG. 10, primarily consists of a plane or level filter material 2, one of whose surfaces is provided with an embossed structure which consists of a multitude of raised elements, preferably bud-like embossed spots 3. The embossed structure may be formed in a variety of manners, such as passing the filter material 2, which is in sheet form and initially smooth, through an assembly of embossing rolls or the like. During this process, the opposite surface of the filter material 2 is provided with a number of concave impressions 3' whose shape corresponds to the burled shape of the embossed spots 3 on the upper surface of the filter material 2. In a typical application, the filter material layer 2 may measure 0.5 to 1 mm in thickness, whereas the height of the bud-like embossed parts would be between 0.5 and 1 mm.

Figure 2:
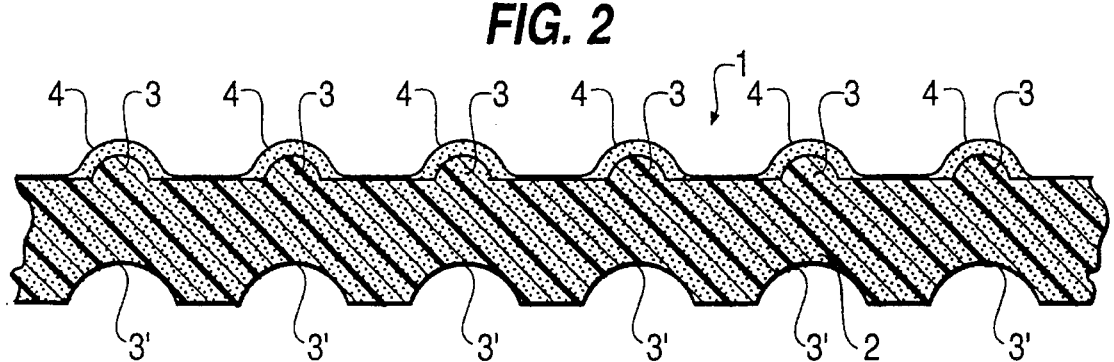
FIG. 2 is a sectional view of the filter medium which is slightly enlarged compared to FIG. 1, and which shows that the surface of the filter medium with the embossed structure has been subjected to an additional treatment by application of a curable coating mass.

After this embossed structure has been produced, according to the invention, the surface of the filter medium 1 is further treated as illustrated in FIG. 2. In this additional treatment, a layer of hardenable coating mass 4 is applied in the area of the embossed spots 3. Such a coating mass 4 may, for example, be an adhesive by which the bud-like prominences 3 are covered and thus virtually sealed. Formed in this manner, abrasion of the filter material at the contact spots which correspond to the raised bud-like embossed spots 3 is avoided while the filter cartridge is operating.

As already explained, these bud-like embossed spots 3 ensure a certain distance between the pleats of a pleated bellows when the filter pleats "collapse" while being charged with the gas stream to be cleaned while the filter cartridge is operating. Such a spacing can prevent a reduction of the effective filter area.

The adhesive used for the coating mass 4 must be an adhesive which can be glued to the filter material or an effective filter layer of the filter medium, e.g., polytetrafluoroethylene, and which hardens after application. For this purpose, a variety of materials may be suitable, such as one-component or multi-component adhesives, thermoplastic materials which harden by cooling, silicone, hot melt mass, varnish, prefabricated adhesive or plastic net, direct thermal treatment, or the like.

Figure 3:
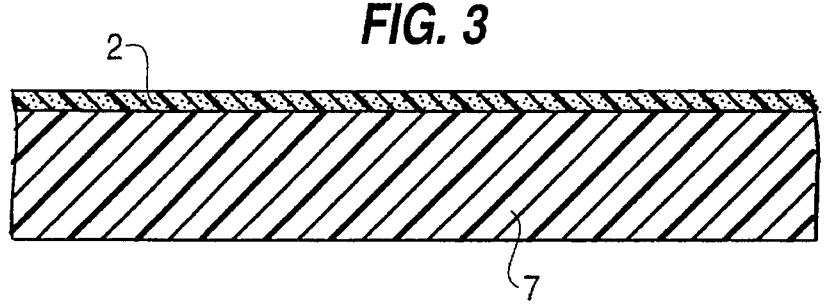
FIG. 3 is a schematic sectional view through a section of another embodiment of a filter medium which is in the form of a laminate.

In contrast to the filter medium of FIGS. 1 and 2, FIG. 3 shows a filter medium which is in the form of a laminate which comprises a layer of a carrier material 7, e.g., polyester, and an effective filter layer arranged on top, e.g., a layer of expanded polytetrafluoroethylene 2. From this laminate, a filter medium 6 as can be seen in FIG. 4 is produced. After raised embossed spots 3 have been imparted to the surface incorporating the expanded PTFE 2, an additional treatment is performed by applying a coating mass 4 in the area of these burled prominences 3, as already explained with reference to FIGS. 1 and 2. The surface of the carrier material 7 located opposite of the burled prominences 3 is provided with the complementary dome shaped impressions or indentations 3' which result from the embossing procedure applied.

FIG. 5 shows a perspective partial view of a filter medium 1 produced according to the process of the invention. A partial view of the surface of this filter medium is shown which is provided with numerous bud-like embossed parts 3 which are coated with a coating mass 4. On the opposite side of the filter medium 1 there are the concave indentations 3' corresponding to the burl-like raised parts.

Figure 6:
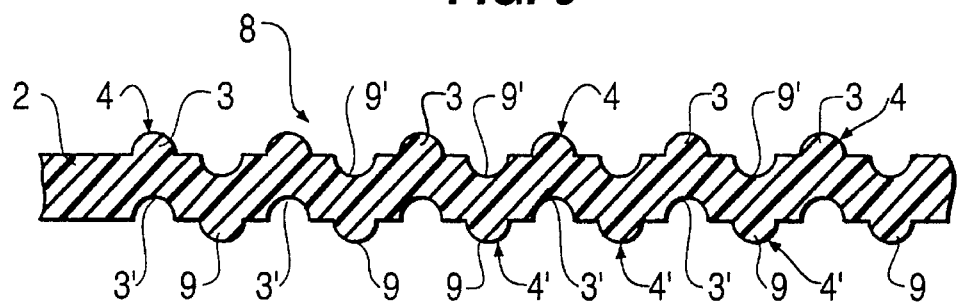
FIG. 6 is a schematic sectional view through a part of a further embodiment of a filter medium whose two surfaces have been provided with a prominent embossed structure.
Figure 7:
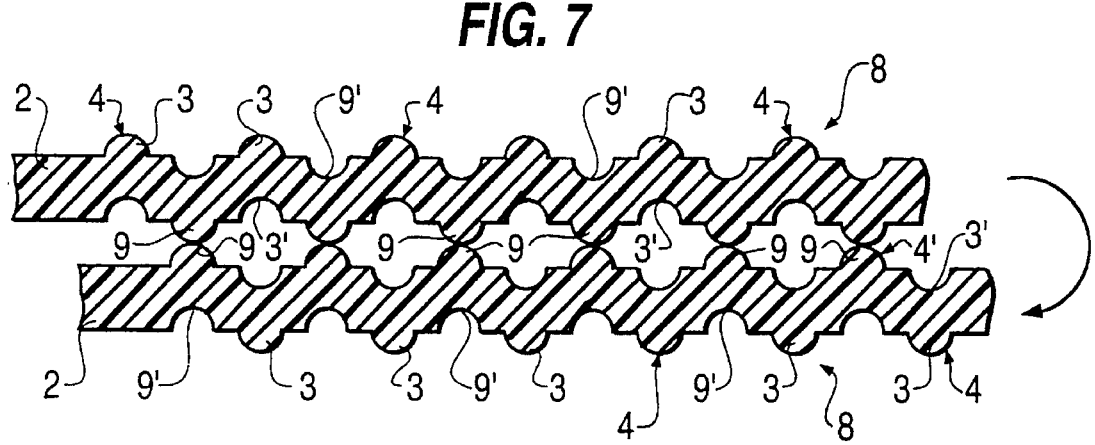
FIG. 7 is a schematic sectional view through two parts of filter media according to FIG. 6 which are arranged such that their surfaces are located adjacent to each other.

FIG. 6 shows an embodiment of a filter medium 8 which comprises a filter material 2 and which has been modified compared to the filter medium of FIGS. 1 to 5 insofar as it is provided with a multitude of raised, burl-like embossed parts 3 and 9 on both surfaces. In this case, too, the embossed parts 3 and 9 have been subjected to an additional treatment by application of a layer of a coating mass 4, 4' in the same way as described above. This construction is identified herein as a double embossed filter medium 8. If this filter medium is, for example, used in a filter cartridge in the form of a pleated bellows, as shown in FIG. 10, the pleats are prevented from "collapsing" both on the clean gas side and on the raw gas side. The surfaces of the filter medium 8 come into contact with each other either next to each other or on top of each other, as shown in FIG. 7, so that the raised embossed parts 9 or 3 touch each other more or less on the surfaces of the filter medium 8 located opposite of each other or on the corresponding pleats of the filter cartridges, as shown in detail in FIG. 7. The complementary concave indentations located opposite of the embossed parts 9 in the filter material 2 are designated as 9'.

This construction ensures the desired spacing effect between interactive filter cartridge pleats both on the charge side (raw gas side) and on the discharge side (pure gas side) of the filter cartridge.

FIG. 9 shows another embodiment of a filter medium 30 which consists of a glass fiber filter material 31. This material has a predetermined number of rib-like embossed parts 32 which extend in parallel to each other on one of its surfaces and which are coated with a corresponding layer of a curable or hardenable coating mass 33. On the opposite surface of the glass fiber filter material 31 there are concave impressions or indentations 32' which are each located opposite an embossed rib 32 and are produced due to the embossing process used.

As far as the filter medium 30 of FIG. 9 is concerned, it is possible to impart a double-sided embossing effect to it such that on both surfaces there are embossed ribs 32 which are coated with a coating mass 33 in the longitudinal direction of the embossed ribs 32 and are thus sealed. An additional thermal treatment or a purely thermal sealing of the embossed ribs 32 can be envisaged in this way.

FIG. 9a shows an embodiment of a filter medium 30' which is slightly modified compared to filter medium 30 shown in FIG. 9. In this case the embossed ribs provided on one of the surfaces of the filter material 31 are not designed as continuous longitudinal ribs but are subdivided by relatively short slot-shaped interruptions 34 provided at regular intervals so that a number of individual rib sections 32a, 32b, 32c, etc., is produced. As a consequence of the slot shaped interruption spots 34 which flush with each other, drainage grooves are created for the dust caked in the transverse direction to the alignment of these rib-shaped sections, as indicated by the arrows Pf1, Pf2 in FIG. 9a. When such a filter medium 30' is used in a filter cartridge like the one explained with reference to FIG. 10, below, the dust cake released during the cleaning of the surface of the filter medium 30' can fall down along those drainage grooves formed by the interruptions 34 without being obstructed by the rib-shaped embossed sections on the surface of the filter medium 30'.

Figure 10:
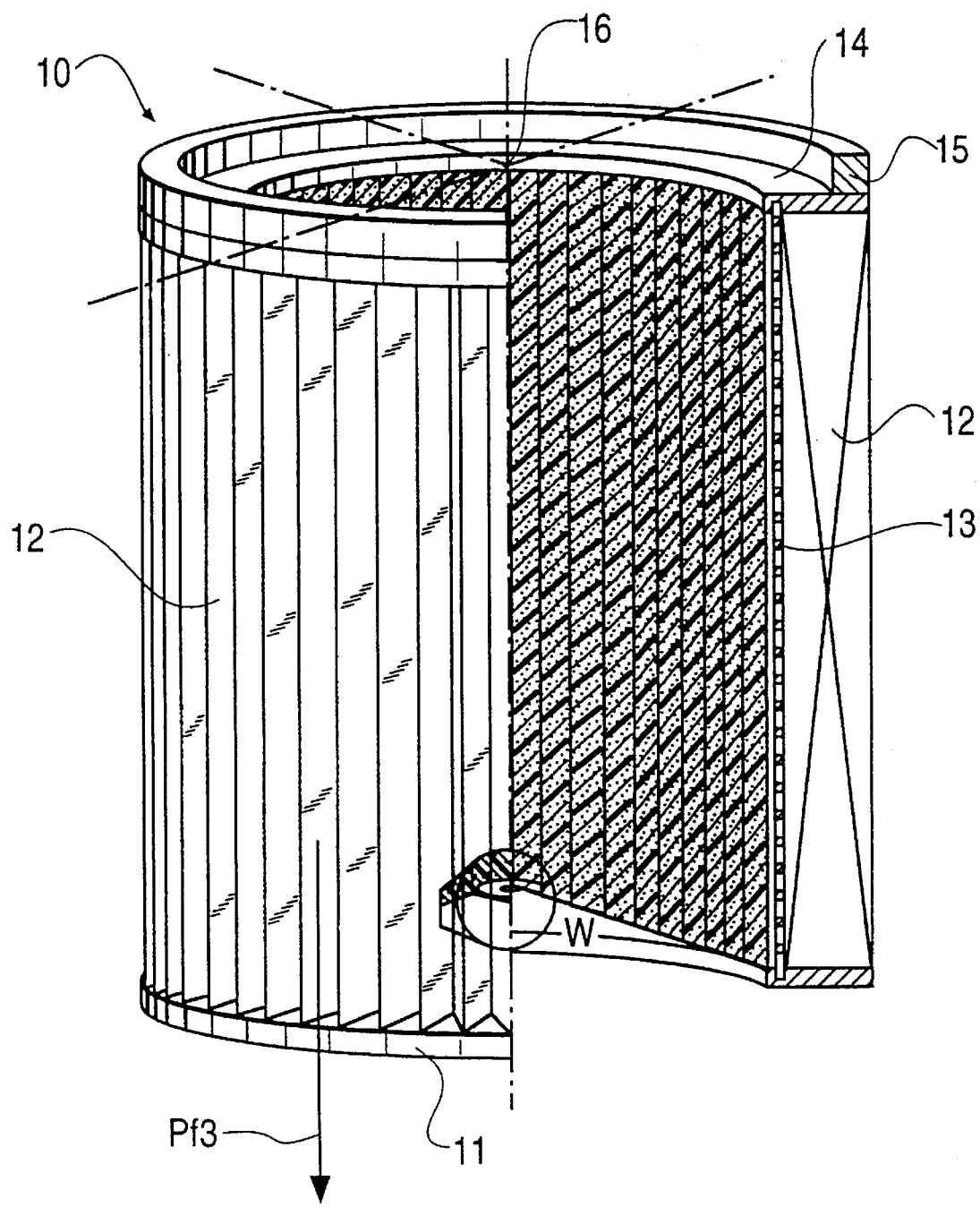
FIG. 10 is a schematic perspective view of an embodiment of a filter cartridge which has been provided with a filter medium produced according to the invention.

FIG. 10 shows an embodiment of a filter cartridge 10 wherein a filter medium produced according to the process of the present invention is brought into the shape of a pleated bellows 12 which surrounds an inner cylindrical perforated piece of sheet metal 13. This filter cartridge 10 furthermore comprises a lower end piece 11 and an upper end piece 14 in the form of a circular ring around a central outlet 16. The filter cartridge 10 is attached to an assembly floor (not shown) at its upper end piece 14 and a sealant 15, (e.g., a silicone sealant) serves to seal this assembly floor.

As already explained, the filter cartridge 10 shown in FIG. 10 serves to separate dust while gas flows through it from outside in, (i.e., the raw gas side is located outside of the filter cartridge 10), whereas the clean gas chamber is connected to the inside of the filter cartridge 10 via the outlet opening 16. During operation of this filter cartridge 10, a dust cake is deposited on the outer surface of the filter medium 12 and during cleaning this dust cake falls down in the direction indicated by an arrow Pf3.

Since one of the filter media as explained with reference to FIG. 1 to 9a is used for the bellows 12, collapsing of the pleats of the bellows 12 is prevented on the raw gas side during cleaning, i.e., while the pleats are charged with the gas stream and cleaned, they are prevented from collapsing, which would reduce the effective filter area due to superimposed pleats. In double sided embossed filter media like those explained with reference to FIGS. 6 and 7, too, collapsing is prevented on the clean gas side of the filter cartridge, i.e., at the discharge flow from the filter cartridge.

At the spots where the bud-like embossed parts 3 and 9 or the embossed ribs 32 of the filter medium 1 or 6 or 8 or 30 or 30' touch each other the process of the invention for the production of the filter medium prevents damage to the sensitive filter material, e.g., the expanded PTFE, because these embossed parts or embossed ribs are coated with the applied coating mass 4, 4', or 33 and are thus sealed, which prevents abrasion and thus wear and tear of the filter medium.

Figure 8:
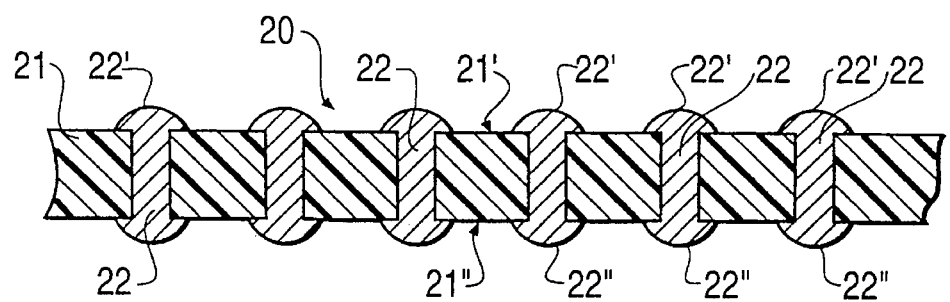
FIG. 8 is a schematic sectional view through a part of a further embodiment of a filter medium which in this case is not provided with a prominent embossed structure on at least one of its surfaces, but which is provided with a predetermined number of rivet-shaped elements which have rounded off rivet heads on both sides.

FIG. 8 shows another example of an embodiment of a filter medium 20 which consists of a plane and basically level filter material 21. In this case, however, a predetermined number of rivet-shaped elements 22 is provided instead of embossing. These elements are provided through the filter material 21 and are provided with rivet heads 22' and 22" on both sides on the surfaces 21' and 21" of the filter material 21 facing each other. Such rivets 22 go completely through the filter material 21 and the material is, so to speak, compressed by the rivet heads 22' and 22" on both sides. In this way a sealing effect is achieved between the two surface sides 21' and 21" of the filter material 21. The rivets can be formed from any suitable material, including metal or plastic. These rivet shaped elements 22 may be designed like snap buttons (i.e., consist of two parts which are put together like snap buttons when they have penetrated the filter material 21), collapsible rivet elements, or other suitable form.

Due to the rounded off rivet heads 22' and 22" the desired space between the individual filter pleats during operation is ensured analogously when the filter cartridges made from such a filter medium are in the form of a pleated bellows, as was already explained above in detail in connection with embossed filter media.

While particular embodiments of the present invention have been illustrated and described herein, the present invention should not be limited to such illustrations and descriptions. It should be apparent that changes and modifications may be incorporated and embodied as part of the present invention within the scope of the following claims.

I claim:

1. For use in a filter cartridge, a filter medium comprising: a laminate having disposed on at least one surface thereof a plurality of protuberances oriented so as to provide spacing between components of the filter cartridge, said filter medium being formed into a pleated moveable bellows having a plurality of pleats forming said components, characterized in that a coating mass is applied exclusively in the area of the protuberances which contact each other during use of the filter cartridge so as to provide protection against wear in said area of the protuberances, the remaining surface of the filter medium being free from said coating mass.

2. The filter cartridge of claim 1, wherein said coating mass is an adhesive.

3. The filter cartridge of claim 1, wherein said coating mass is a thermoplastic material which hardens when cooled and which is selected from the group comprising: polyethylene, polypropylene, polyester, and a high-temperature thermoplastic material.

4. The filter cartridge of claim 1, wherein said coating mass is a prefabricated adhesive net.

5. The filter cartridge of claim 1, wherein said coating mass is prefabricated plastic net.

6. The filter cartridge of claim 1, wherein said coating mass is silicone.

7. The filter cartridge of claim 1, wherein said coating mass is a hotmelt mass.

8. The filter cartridge of claim 1, wherein said coating mass is a varnish.

9. For use in a filter cartridge, a filter medium comprising: a laminate having disposed on at least one surface thereof a plurality of protuberance elements oriented so as to provide spacing between components of the filter cartridge, said filter medium being formed into a pleated movable bellows having a plurality of pleats forming said components, characterized in that a sealing by purely thermal treatment is provided exclusively in the area of the protuberance elements which contact each other during use of the filter cartridge so as to provide protection against wear in the said area of the protuberance elements, the remaining surface of the filter medium being free from sealing.

10. The filter cartridge of claim 9, wherein the laminate comprises a carrier material and polytetrafluoroethylene.

11. The filter cartridge of claim 9, wherein the laminate includes a glass fiber material.

12. The filter cartridge of claim 9, wherein the protuberances comprise embossed spots on the filter element.

13. The filter cartridge of claim 9, wherein the protuberances comprise a plurality of embossed ribs.

14. The filter cartridge of claim 9, wherein the protuberances are provided on both a top and bottom surface of the filter medium.

* * * * *